United States Patent
Söllinger et al.

(10) Patent No.: US 12,544,849 B2
(45) Date of Patent: Feb. 10, 2026

(54) METHOD FOR CONTROLLING A WELDING PROCESS

(71) Applicant: Fronius International GmbH, Pettenbach (AT)

(72) Inventors: Dominik Söllinger, Krenglbach (AT); Manuel Mayer, Edt bei Lambach (AT); Andreas Waldhör, Pettenbach (AT); Angelika Kogler, Thalheim bei Wels (AT)

(73) Assignee: Fronius International GmbH, Pettenbach (AT)

( * ) Notice: Subject to any disclaimer, the term of this patent is extended or adjusted under 35 U.S.C. 154(b) by 1054 days.

(21) Appl. No.: 17/418,405

(22) PCT Filed: Dec. 12, 2019

(86) PCT No.: PCT/EP2019/084889
§ 371 (c)(1),
(2) Date: Jun. 25, 2021

(87) PCT Pub. No.: WO2020/136019
PCT Pub. Date: Jul. 2, 2020

(65) Prior Publication Data
US 2022/0055137 A1    Feb. 24, 2022

(30) Foreign Application Priority Data
Dec. 27, 2018 (EP) .................................... 18248057

(51) Int. Cl.
*B23K 9/09* (2006.01)
*B23K 9/095* (2006.01)
*B23K 9/173* (2006.01)

(52) U.S. Cl.
CPC .............. *B23K 9/092* (2013.01); *B23K 9/093* (2013.01); *B23K 9/0953* (2013.01); *B23K 9/173* (2013.01)

(58) Field of Classification Search
CPC .......... B23K 9/09; B23K 9/092; B23K 9/093; B23K 9/095; B23K 9/0953; B23K 9/173; B23K 9/073
See application file for complete search history.

(56) References Cited

U.S. PATENT DOCUMENTS

| 2001/0020889 A1 | 9/2001 | Lee |
| 2007/0056944 A1 | 3/2007 | Artelsmair |

(Continued)

FOREIGN PATENT DOCUMENTS

| JP | S-60255276 A | 12/1985 |
| JP | 2001-1142 A | 1/2001 |

(Continued)

OTHER PUBLICATIONS

English language translation of Office action of counterpart Japanese Patent Application No. 2021-537752, Office action issued on Jun. 28, 2022.

(Continued)

*Primary Examiner* — Sang Y Paik
*Assistant Examiner* — Bonita Khlok
(74) *Attorney, Agent, or Firm* — GREENBLUM & BERNSTEIN, P.L.C.

(57) ABSTRACT

In order to develop a welding process in such a way that uniform flaking of a weld seam can be guaranteed even with a higher number of short-circuit cycles, a specific number of short-circuit cycles is specified for the cold welding phase and the cold phase duration of the cold welding phase is determined for a number of short-circuit cycles that exceeds a specified limit cycle number, depending on a determined (Continued)

Figure 1:
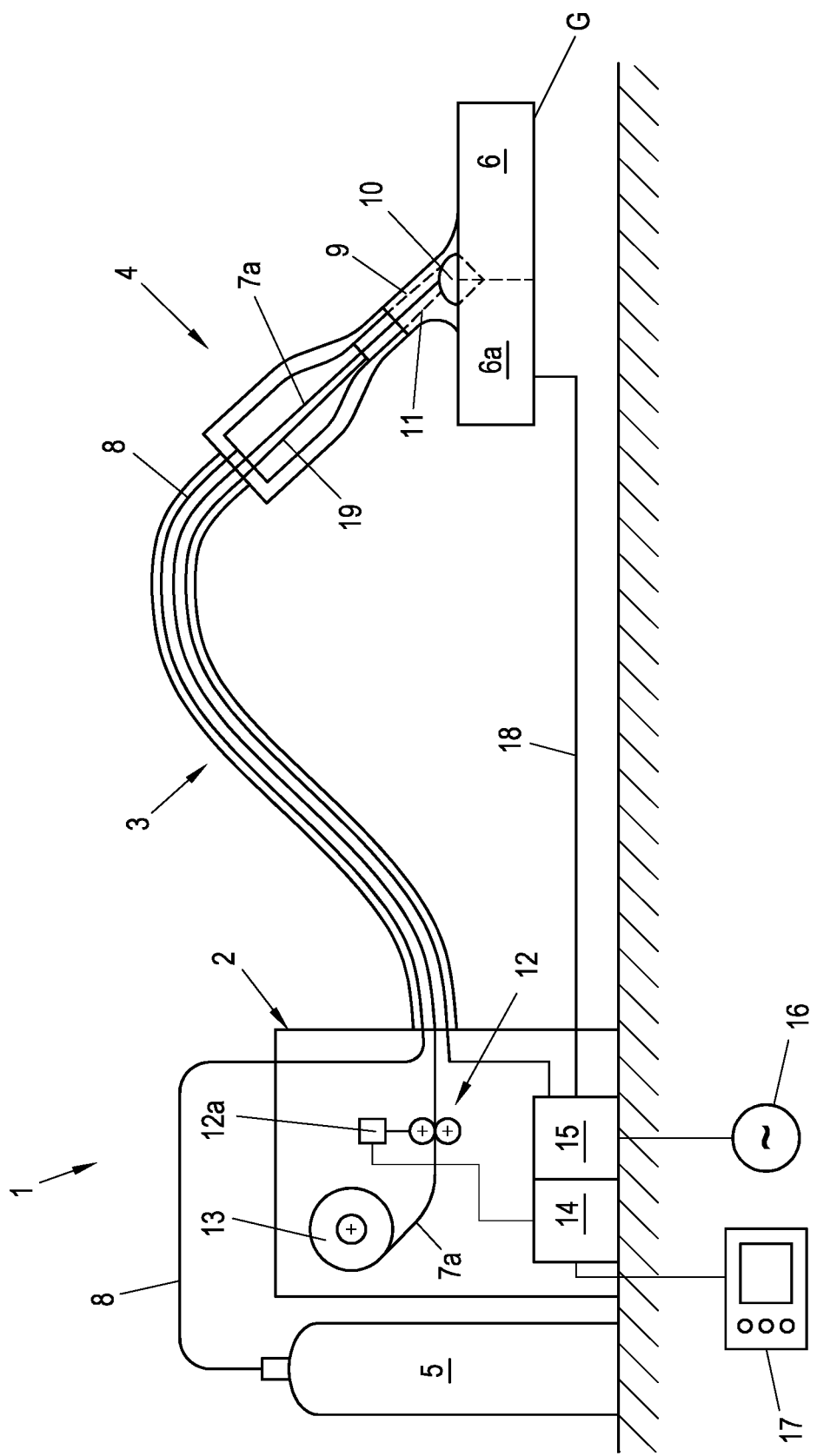

cold phase time and after the cold welding phase, there is a switch to the hot welding phase.

19 Claims, 3 Drawing Sheets

(56) References Cited

U.S. PATENT DOCUMENTS

| | | |
|---|---|---|
| 2012/0255940 A1 | 10/2012 | Fujiwara et al. |
| 2013/0168375 A1* | 7/2013 | Aberg .................... B23K 9/095 219/130.01 |
| 2014/0124491 A1 | 5/2014 | Daniel et al. |
| 2014/0263239 A1 | 9/2014 | Peters |
| 2017/0200108 A1* | 7/2017 | Au ................... G06Q 10/06398 |
| 2017/0225253 A1* | 8/2017 | Matsuoka ............... B23K 9/095 |
| 2017/0355034 A1* | 12/2017 | Matsuoka ............... B23K 9/073 |
| 2019/0176257 A1* | 6/2019 | Furuyama ............... B23K 9/073 |

FOREIGN PATENT DOCUMENTS

| | | |
|---|---|---|
| KR | 10-2003-0083652 | 10/2003 |
| WO | 2005/042199 | 5/2005 |
| WO | 2018/043626 | 3/2018 |

OTHER PUBLICATIONS

Int'l Search Report (Form PCT/ISA/210) conducted in Int'l Appln. No. PCT/EP2019/084889 (Jul. 2, 2020).
Int'l Written Opinion (Form PCT/ISA/237) conducted in Int'l Appln. No. PCT/EP2019/084889 (Jul. 2, 2020).
Int'l Prelim. Exam. Report (Form PCT/IPEA/409) conducted in Int'l Appln. No. PCT/EP2019/084889 (Mar. 31, 2021) (w/translation).
Office action issued Oct. 18, 2022, for Korean Patent application No. 10-2021-7022447, a parallel application of the instant application, along with an English translation.

* cited by examiner

METHOD FOR CONTROLLING A WELDING PROCESS

The invention relates to a method for controlling a welding process with a consumable electrode, in which method, after the ignition of an arc between the electrode and a base material, at least two different chronologically sequential welding phases are used, a cold welding phase being used during a cold phase duration and a hot welding phase being used during a subsequent hot phase duration, at least one short-circuit cycle having a short-circuit cycle time being carried out in the cold welding phase.

The invention further relates to a welding device for carrying out a welding process, which device comprises at least one control unit for controlling the welding process, a welding torch and at least one feed unit for feeding a consumable electrode to the welding torch.

Gas metal arc welding (GMAW) processes have been known in the prior art for many years. These include, for example, the metal inert gas (MIG) welding method or the metal active gas (MAG) welding method, in which a consumable electrode made of a metal electrode material is surrounded by a shielding gas. Gas metal arc welding processes are usually used either to apply a weld seam to a base material (build-up welding) or to join two base materials (joint welding). In both cases, an arc is ignited between the electrode and the base material by means of an electric voltage or an electric current resulting therefrom, which arc fuses the electrode and the region of the base material surrounding the electrode, creating an integral bond. The same or a similar material as for the base material is usually used as the electrode material. The electrode is fed to the welding point at a specific electrode feed rate; the electrode feed rate can be fixed, e.g. in manual welding by hand or by setting on the welding device, or can also be dependent on other parameters, for example on a welding speed at which the electrode is moved relative to the base material or depending on the current, etc.

The shielding gas is used to shield the arc and the region of the melt from the atmosphere, substantially to avoid oxidation. Either an inert gas (MIG) or an active gas (MAG) is used as the shielding gas. Inert gases, for example helium (He) or argon (Ar), are gases that do not enter into any chemical reactions with the melt. The MIG method is mainly used for non-ferrous metals and high-alloy steels. Active gases such as carbon dioxide ($CO_2$) or oxygen (O) are highly reactive gases that are used to consciously change the composition of the melt. They are preferably used for unalloyed and low-alloy steels.

For many years, the so-called cold metal transfer method (also known as the CMT method) has been used successfully for GMAW processes or short-circuit welding processes. Building on this, there is the CMT mix method, in which a cold welding phase, in particular a short-circuit welding phase with relatively low heat input, in which the welding wire moves forwards and backwards, and a hot welding phase with a relatively high heat input (e.g. pulse welding phase or spray welding phase) are used alternatingly. Details in this regard are known to the person skilled in the art.

The advantage of this method compared to conventional methods (e.g. pure pulse welding) is that the regulated current supply and the supporting effect of the wire movement during the material transfer result in only a very low heat input to the base material. The CMT mix method is used, inter alia, for mixed metal connections, for example for the connection of steel and aluminum.

Previously, the welding phases with high heat input (pulse welding phase) and the welding phases with low heat input (short-circuit welding phase or short-circuit welding process) were substantially combined as desired, as disclosed, for example, in WO 2005/042199 A1 by the applicant. The start of the short-circuit welding phase is triggered, for example, depending on the number of pulses in the pulse welding phase, depending on the duration of the pulse welding phase, or by a trigger signal. The duration of the different welding phases with different heat input can be determined, for example, by a percentage ratio, such as the number of pulses in the pulse welding phase to the number of pulses or cycles in the short-circuit welding phase. The duration of the welding phases can also be dependent on the welding current set, for example a longer short-circuit welding phase with a low welding current and a shorter short-circuit welding phase with a higher welding current.

As a rule, a number of short-circuit cycles is specified for the short-circuit welding phase, each short-circuit cycle requiring a specific short-circuit cycle time in order to be carried out. The entire duration of the short-circuit welding phase is consequently defined by the sum of the short-circuit cycle times of the individual short-circuit cycles. For example, a selection of ten short-circuit cycles can be selected on a control unit, each of which has a cycle time of, for example, approximately 10 ms. The entire duration of the short-circuit welding phase would therefore be 100 ms (10 cycles×10 ms cycle time). The duration of the subsequent pulse phase (or generally hot welding phase) is usually determined by specifying a pulse phase time or hot phase time.

The short-circuit cycle time of the short-circuit cycles of the short-circuit welding phase is not always constant during welding, which means that a first short-circuit cycle can last, for example, 10 ms, a second short-circuit cycle 12 ms, a third short-circuit cycle 9 ms, etc. This can depend on the position and geometry of the weld seam. However, it may also be due to the fact that the time of the short circuit varies. With a small preset number of short-circuit cycles of, for example, 3 cycles per short-circuit welding phase, this has relatively little effect. If, however, a higher number of short-circuit cycles is selected, for example 5-10 short-circuit cycles per short-circuit welding phase, this can certainly lead to considerable fluctuations over time in the total duration of a short-circuit welding phase. This can mean that a first short-circuit welding phase with 10 cycles does not last 100 ms, for example, but instead only 80 ms and a second short-circuit welding phase with 10 cycles does not last 100 ms but instead 120 ms. This is disadvantageous because these different durations of the short-circuit welding phase have a negative effect on the flaking of the weld seam and thus on the quality of the weld seam. In particular, such fluctuations lead to uneven flaking, the duration of the short-circuit welding phase substantially correlating with the length of a flake (at a constant welding speed).

The object of the invention is therefore to develop a welding method of the type mentioned in such a way that more uniform flaking of a weld seam can be ensured even with a higher number of short-circuit cycles.

According to the invention, this object is achieved in that a specific number of short-circuit cycles is specified for the cold welding phase and in that the cold phase duration of the cold welding phase is determined, for a number of short-circuit cycles that exceeds a specified limit cycle number, depending on a determined cold phase time and in that after the cold welding phase, there is a switch to the hot welding phase. By switching to a time query, the fluctuations in the cold phase duration, which disadvantageously occur in particular with a larger number of short-circuit cycles, can be reduced and very uniform flaking of a weld seam can be achieved.

It is advantageous that, in order to determine the cold phase duration depending on the cold phase time, a short-circuit cycle that has already started at the time of expiry of the cold phase time is ended before the switch to the hot welding phase. This ensures that an ongoing short-circuit cycle is not interrupted, which further improves the flaking of the weld seam.

Preferably, in order to determine the cold phase duration depending on the cold phase time before the end of the cold phase time, a tolerance point in time is specified from which the start of a new short-circuit cycle is omitted, i.e., not begun, a short-circuit cycle carried out at the tolerance point in time being completed before the switch to the hot welding phase. This ensures that no new short-circuit cycle is started if the end of the cold phase time were to fall at a time shortly after the start of a new short-circuit cycle. As a result, fluctuations in the cold phase duration can be further reduced.

The limit cycle number is preferably selected to be between one and thirty, in particular between five and ten. Good results could be achieved in this range.

Most preferably, the cold phase time is determined by multiplying the number of specified short-circuit cycles by an average short-circuit cycle time, the average short-circuit cycle time being set preferably between five and fifteen milliseconds, in particular ten milliseconds. By using an average short-circuit cycle time, empirical values or experimentally determined measured values from welding processes, for example, can be used.

In order to reduce spatter, the electrode is advantageously moved once per short-circuit cycle in the direction of the base material until it touches the base material and then, after a short circuit has formed, is preferably moved away from the base material in the opposite direction.

A pulsed welding current is preferably used as the welding current in the hot welding phase, as a result of which the heat input into the base material can be increased. This means that a pulse welding process or spray welding process can be used in the hot welding phase.

The cold phase duration of the cold welding phase is preferably determined, for a number of short-circuit cycles that corresponds to the specified limit cycle number or is below the specified limit cycle number, by a sum of the short-circuit cycle times of the specified number of short-circuit cycles. As a result, welding can be carried out in a conventional manner with a relatively small number of short-circuit cycles, since the fluctuations have less of an effect on the flaking of the weld seam.

The object is also achieved with a welding device mentioned at the outset in that the control unit controls the cold phase duration of the cold welding phase, a specific number of short-circuit cycles being specified for the cold welding phase and the cold phase duration of the cold welding phase, for a number of short-circuit cycles that exceeds the specified limit cycle number, being dependent on a determined cold phase time, and in that after the cold welding phase, there is a switch to the hot welding phase.

Figure 2:
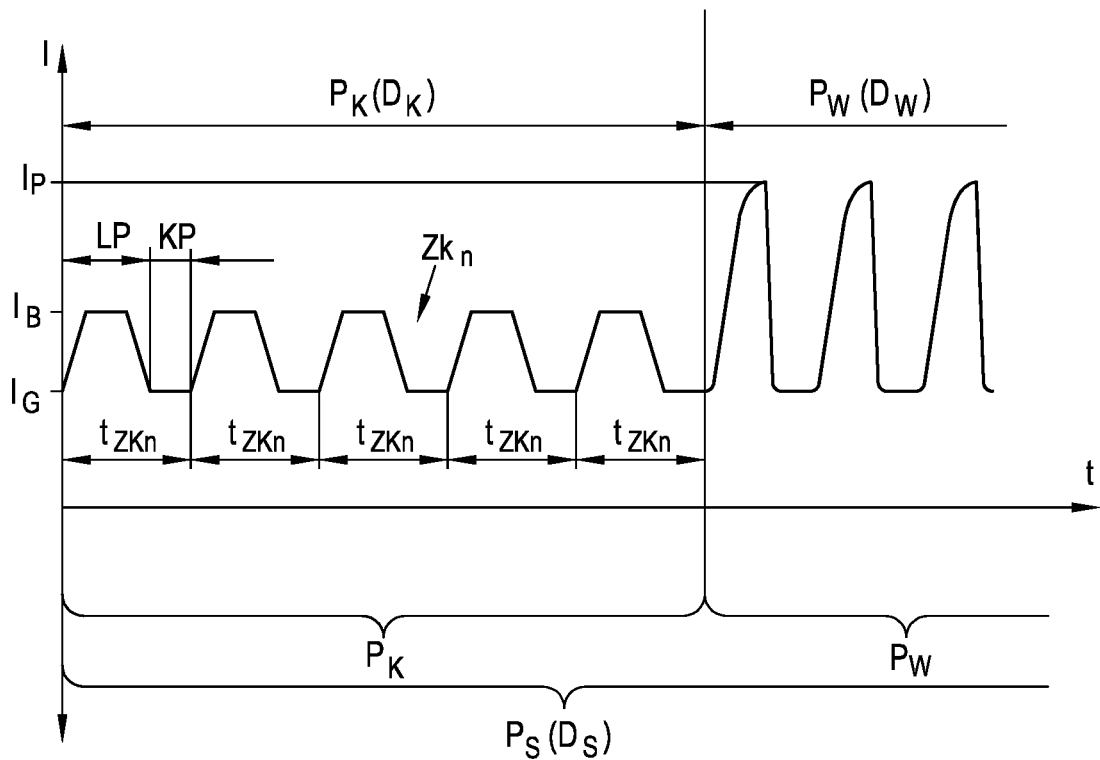
Figure 3:
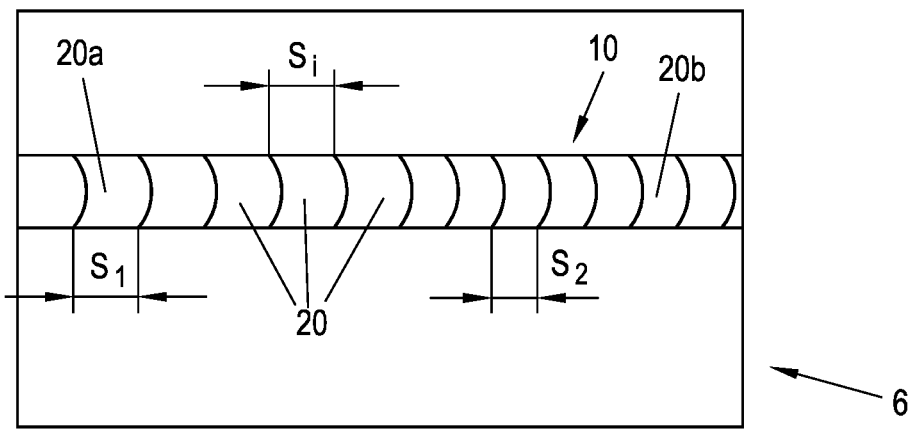

The present invention is described in greater detail below with reference to FIGS. 1 to 4, which show exemplary, schematic and non-limiting advantageous embodiments of the invention. In the drawings FIG. 1 shows a standardized design of a welding device,
FIG. 2 shows a schematic sequence of a welding process,
FIG. 3 shows a workpiece with a weld seam,
FIG. 4a-4c each show a schematic time curve of a welding parameter of the welding method according to the invention.

A gas metal arc welding (GMAW) device 1 is shown schematically in FIG. 1. The welding device 1 comprises a welding current source 2, a hose assembly 3, a welding torch 4, and a shielding gas container 5 having a shielding gas SG. The shielding gas container 5 is connected to the welding torch 4 by means of a shielding gas line 8. A pressure regulator (not shown), for example in the form of a known cylinder fitting, can be provided on the shielding gas container 5 or in the shielding gas line 8, which pressure regulator usually serves to regulate the flow of the shielding gas SG. A welding electrode 7 in the form of a welding wire 7a can be arranged in the welding current source 2, which welding electrode is usually wound on a welding wire roll 13. A feed unit 12, or simply "feeder", is arranged for unwinding the welding wire 7a and in particular for supplying the welding wire 7a to a welding point, which feed unit is driven by a feed drive unit 12a.

The welding wire 7a on the welding wire roll 13 can, however, also be arranged outside the welding current source 2 in a unit which is separate therefrom. The feed drive unit 12a is controlled by a control unit 14, which in turn usually communicates with a user interface 17. A user can specify specific welding parameters via the user interface 17, such as a welding voltage U, a welding current I, a wire feed speed vd, etc. For example, predefined welding programs having specific preset welding parameters can also be stored in the control unit 14, or simply "control", which programs can be selected by the user via the user interface 17. A power part 15 is also arranged in the welding current source 2, which power part is controlled in an open-loop manner (or a closed-loop manner) by the control unit 14 and is connected to an external voltage supply 16.

The power part 15 of the welding current source 2 supplies the welding torch 4 with the required welding current I via a current line 19 arranged in the hose assembly 3. In addition, the welding wire 7a (by means of the feed unit 12) and the shielding gas SG, and optionally also a cooling medium for cooling the welding torch 4, are usually supplied to the welding torch 4 via the hose assembly 3. Control lines can also be provided in the hose assembly. However, a plurality of individual lines for the respective media, control elements, and energies can be provided as the hose assembly 3. In particular, a separate wire feed unit (not shown) can be provided on the welding torch 4 in order to carry out the CMT welding process mentioned above, which feed unit is suitable for changing the wire feed in the cold welding phase as quickly as possible between a positive wire feed in the arc (in the direction of the workpiece 6) and a negative wire feed in the short circuit (in the direction away from the workpiece 6).

In order to carry out a welding process, a first electrical potential is applied to a workpiece 6 made of a base material G by means of a current line 18 and a second electrical potential is applied to the welding wire 7a as a welding electrode via the current line 19, as a result of which a welding current I flows after an arc 11 has been ignited between the welding wire 7a and the workpiece 6. The welding wire 7a and a region of the base material G are fused by means of the arc 11, resulting in an integral bond between the welding wire 7a and the base material G. In the example shown, a weld seam 10 is welded onto the workpiece 6; this is referred to as build-up welding. However, two workpieces 6, 6a could also be connected, as shown by the dashed line; this is referred to as joint welding. The shielding gas flowing out of the welding head 4 flows around the arc 11 in the form of a shielding gas bell 9 in order to shield the region of the fused material in the region of the weld seam 10 from the environment. It should be noted, however, that welding could in principle also be carried out without shielding gas. In this case, a shielding gas container 5 and a shielding gas line 8 could also be dispensed with.

As mentioned at the outset, depending on the material of the basic material G, either low-reactive inert shielding gases SGi such as argon (Ar) or helium (He) or active shielding gases SGa such as oxygen (O) or carbon dioxide ($CO_2$) are used. The welding wire 7a is supplied to the welding point S at a specific wire feed speed $v_d$, which can be dependent on several influencing variables. In manual welding, in which the welding head 4 is guided by hand by a person, a constant wire feed speed $v_d$ is usually selected depending on the welding current I set, for example. In automated welding processes, for example when the welding torch 4 is guided by a robot, the wire feed speed $v_d$ can, for example, additionally be selected depending on a welding speed $v_s$ at which the welding torch 4 is moved relative to the workpiece 6. Of course, there can also be other influencing variables and welding parameters or other embodiments of the GMAW device 1. The basic known principle remains the same, which is why no detailed description is given here. The method according to the invention is described in more detail below with reference to FIG. 2.

FIG. 2 shows an exemplary, schematic curve of the welding current I of a welding process over time t with two welding phases, with typically different heat inputs into the base material G of a workpiece 6. A cold welding phase $P_K$ with a low heat input and a hot welding phase $P_W$ with a relatively higher heat input alternate over time. A constant welding current I can be provided in the hot welding phase $P_W$, or a pulsed welding current I can be provided, as shown in FIG. 2, reference usually being made to a pulse welding phase in this case. The cold welding phase $P_K$ is carried out during a cold phase duration $D_K$ and the hot welding phase $P_W$ is carried out during a hot phase duration $D_W$.

The cold welding phase $P_K$ and the hot welding phase $P_W$ together form a total welding cycle $P_S$ with a total welding cycle duration $D_S$. During welding, a large number of such total welding cycles $P_S$ are carried out one after the other. In the cold welding phase $P_K$, the short-circuit welding method described at the outset is used, which is characterized by a reversing wire feed speed, the direction of the wire feed speed also being able to change. Since the welding method with a short-circuit welding phase as the cold welding phase $P_K$ and the pulse welding phase as the hot welding phase $P_W$ is known, it will be discussed here only briefly.

For example, at the beginning of the cold welding phase $P_K$ (corresponds, for example, to the end of the preceding hot welding phase $P_W$), the welding wire 7a is conveyed from a starting position (e.g. a specified electrode distance between the welding wire 7a and the workpiece 6) at a specific wire feed speed in the direction of the workpiece 6 until the welding wire 7a touches the workpiece 6. During the fusing of the welding wire 7a, the wire feed speed is briefly increased to a defined maximum wire feed speed. At the same time, the welding current I can also be reduced from a high welding current I, a so-called boost current $I_B$, to a current I which is lower relative to the boost current $I_B$, a so-called waiting current $I_G$, until the short circuit is reached. Thereafter, the direction of the wire feed is preferably reversed at a wire feed speed, i.e. the welding wire 7a is moved away from the workpiece 6 and the waiting current $I_G$ is increased again to the boost current $I_B$, etc.

However, it is not absolutely necessary to move the welding wire 7 back away from the workpiece 6; a short-circuit cycle $Z_{Kn}$ could in principle also be carried out without moving the welding wire 7 back and would then end with the renewed increase of the welding current I from the waiting current $I_G$ to the boost current $I_B$. However, it is advantageous to move the welding wire 7 back in order to facilitate the detachment of the welding droplets from the welding wire, as a result of which less spatter occurs. In general, a short-circuit cycle $Z_{Kn}$ consists of an arc phase LP and a short-circuit phase KP, as indicated in FIG. 2; during a short-circuit cycle $Z_{Kn}$, the electrode, in particular the welding wire 7a, is moved at least once until it touches the base material G, generally in the direction of the base material G. The cold welding phase $P_K$ is composed of a number n≥1 of short-circuit cycles $Z_{Kn}$; in the example shown, these are, for example, five short-circuit cycles $Z_{Kn}$ before the transition back to the hot-welding phase $P_W$. Each short-circuit cycle $Z_{Kn}$ takes a specific short-circuit cycle time $t_{ZKn}$; an average short-circuit cycle time $t_{ZKn}$ is, for example, in the range of 10 ms. In the hot welding phase $P_W$, the welding current I can be increased in a pulse-like manner from the waiting current $I_G$ to a pulse current $I_P$ and then decreased again. After the hot welding phase $P_W$, there is a new cold welding phase $P_K$, etc.

Figure 4A:
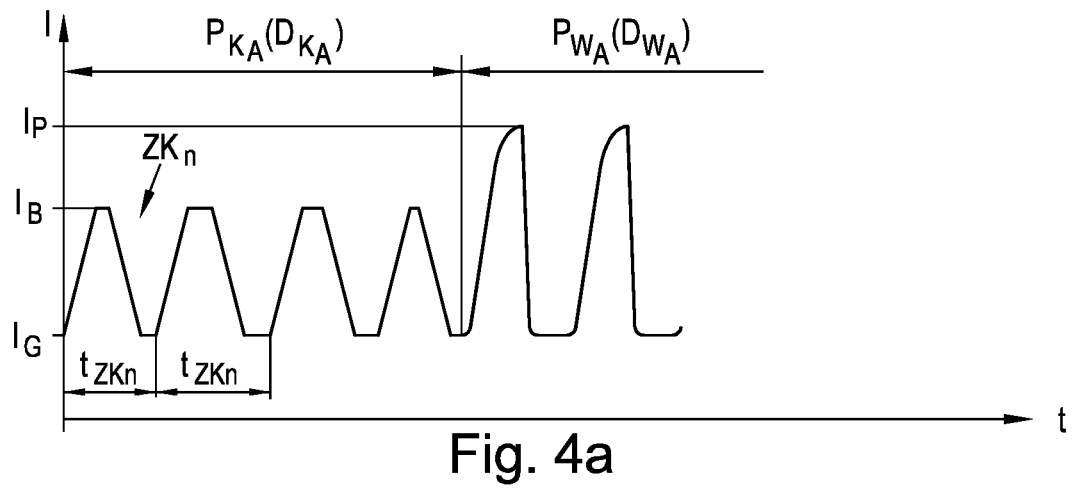
Figure 4B:
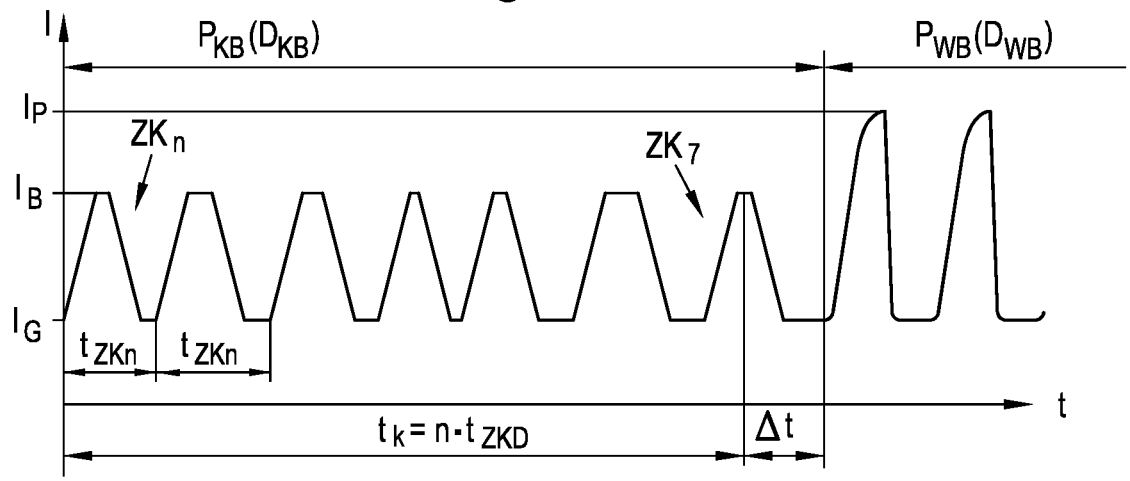
Figure 4C:
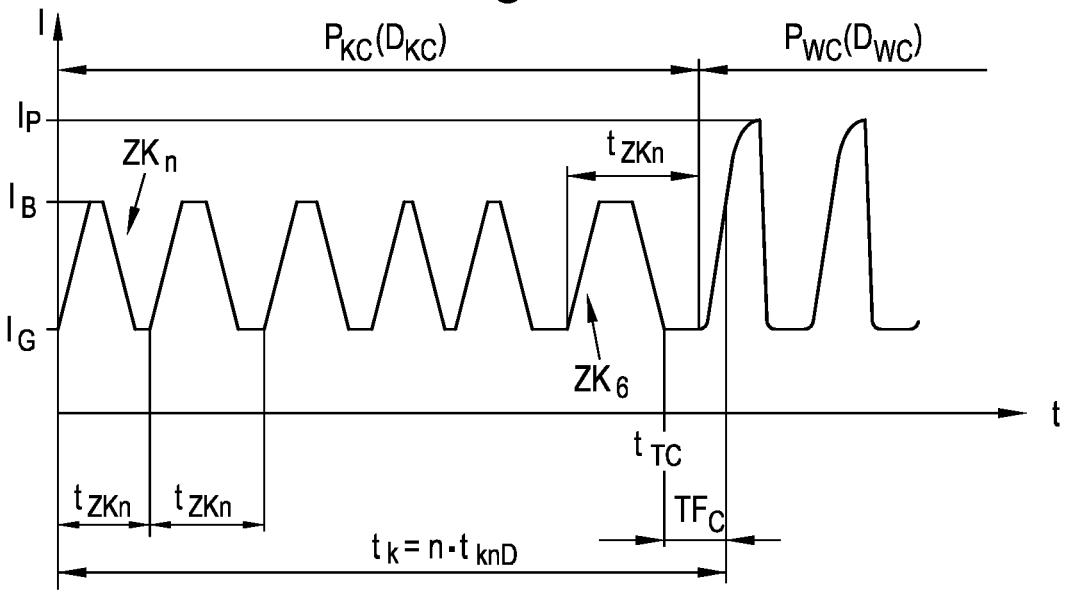

It should be noted again at this point that the curves shown in FIG. 2 and subsequently in FIG. 4a-4c are only schematic examples and are therefore not to be understood as limiting the invention. The curve of a welding parameter, here the welding current I, during the cold welding phase $P_K$ and the hot welding phase $P_W$, for example, is generally not as uniform as shown in practice. In particular, the shape, for example, of individual amplitudes can of course differ. The waiting current $I_G$, the boost current $I_B$ and the pulse current $I_P$ can of course also be subject to certain fluctuations. Of course, the waiting current $I_G$ in the cold welding phase $P_K$ does not have to be the same as in the hot welding phase $P_W$, as shown, but could also be higher or lower in the hot welding phase $P_W$ than in the cold welding phase $P_K$. The length of individual short-circuit cycles $Z_{Kn}$ shown on the time axis, i.e. the short-circuit cycle times $t_{ZKn}$, is of course not to be understood as limiting. The illustrated time relationship between the arc phase LP and the short-circuit phase KP and the relationship between the short-circuit cycle times $t_{ZKn}$ and the length of the pulses of the hot welding phase $P_W$ are also not to be understood as limiting.

The length of the cold phase duration $D_K$ and the hot phase duration $D_W$ are usually specified via the user interface 17. For example, this can be carried out, for example by a user, by a direct specification of a hot phase time $t_W$ of, for example, 150 ms for the hot phase duration $D_W$. The length of the cold phase duration $D_K$ can then take place automatically, for example, depending on the selected hot phase duration $D_W$, for example in the form of a percentage of the hot phase duration $D_W$. The cold phase duration $D_K$ could also be specified directly by a user; this is usually carried out by specifying the number n of short-circuit cycles $Z_{Kn}$. However, the short-circuit cycle times $t_{ZKn}$ are usually subject to certain fluctuations, and therefore not every short-circuit cycle lasts the same length. An average short-circuit cycle time $t_{ZKD}$ (not shown) is usually in the range of 10 ms. This means that a first short-circuit cycle time $t_{ZK1}$ of a first short-circuit cycle $Z_{K1}$ can be, for example, 12 ms and a second short-circuit cycle time $t_{ZK2}$ of a second subsequent short-circuit cycle $Z_{K2}$ can be, for example 8 ms. Accordingly, the total cold phase duration $D_K$, which is composed of the sum of the individual short-circuit cycle times $t_{ZKn}$, fluctuates in the range of a few milliseconds, which can be disadvantageous or undesirable under certain circumstances, as explained in more detail below with reference to FIG. 3.

FIG. 3 shows a workpiece 6 with a weld seam 10 which was produced by means of the described CMT mix process (consisting of cold welding phase $P_K$ or in particular short-circuit welding phase and hot welding phase $P_W$ or in particular pulse welding phase). The weld seam 10 has welding flakes 20 arranged in a row which result from the execution of the process. The shape of the welding flakes 20 and in particular the flake length $s_i$ of the welding flakes 20 is influenced by several welding parameters, in particular by the welding speed of the welding wire 7a relative to the workpiece 6 and also by the total welding cycle duration $D_S$ of a total welding cycle $P_S$. The total welding cycle duration $D_S$ is made up of the cold phase duration $D_K$ and the hot phase duration $D_W$. This substantially means that the longer the total welding cycle duration $D_S$, the greater the flake length $s_i$ of the associated welding flake 20. It can be seen from this that, in particular for a higher number n of short-circuit cycles $Z_{Kn}$ with fluctuating short-circuit cycle times $t_{ZKn}$, the total welding cycle duration $D_S$ and consequently the flake length $s_i$ are also subject to certain fluctuations. If, for example, as mentioned above, a first cold phase duration $D_{K1}$ is, for example, 120 ms due to fluctuations in the short-circuit cycle times $t_{ZKn}$ of the first short-circuit cycles $Z_{K1}$ and a second cold phase duration $D_{K2}$ is, for example, 80 ms due to fluctuations in the short-circuit cycle times $t_{ZKn}$ of a second subsequent short-circuit cycle $Z_{K2}$, this means that a first total welding cycle duration $D_{S1}$ of the first total welding cycle $P_{S1}$ (assuming an equally long hot phase duration $D_{W1}=D_{W2}$ for both total welding cycles $P_{S1}$, $P_{S2}$) is 40 ms longer than a second total welding cycle duration $D_{S2}$ of the second total welding cycle $P_{S2}$. As shown schematically in FIG. 3, this would lead to a second flake length $s_2$ of a second welding flake 20b which is shorter than the first flake length $s_1$ of a first welding flake 20a. Overall, such fluctuations would lead to uneven flaking of the weld seam 10, which under certain circumstances results in local fluctuations in weld seam strength or optical defects and is therefore undesirable.

According to the invention, therefore, the control unit 14 is given a limit cycle number $n_G$ of short-circuit cycles $Z_{Kn}$, which can be carried out, for example, via the user interface 17 or can be permanently programmed. When the set number n of short-circuit cycles $Z_{Kn}$ exceeds the fixed limit cycle number $n_G$, the cold phase duration $D_K$ of the cold welding phase $P_K$ is automatically set by the control unit 14 depending on a determined cold phase time $t_K$, there being a switch to the hot welding phase $P_W$ after the cold welding phase $P_K$. From the specified of limit cycle number $n_G$, there is no longer a wait until the specified number n of short-circuit cycles $Z_{Kn}$ has been carried out, but instead only as many short-circuit cycles $Z_{Kn}$ are carried out as can actually be carried out within the fixed cold phase time $t_K$.

Preferably, however, a short-circuit cycle $Z_{Kn}$ carried out at the time of expiry of the cold phase time $t_K$ is completed before there is a switch to the hot welding phase $P_W$, in order to avoid an abrupt interruption of a short-circuit cycle $Z_{Kn}$ that has just been carried out, which could have a detrimental effect on the quality of the weld seam 10.

If the specified number n of short-circuit cycles $Z_{Kn}$ corresponds to the specified limit cycle number $n_G$ or falls below the limit cycle number $n_G$, the cold phase duration $D_K$ of the cold welding phase $P_K$ is preferably determined by a sum $\Sigma t_{ZKn}$ of the short-circuit cycle times $t_{ZKn}$ of the specified number n of short-circuit cycles $Z_{Kn}$ ($\Sigma t_{ZKn}=t_{ZK1}+t_{ZK2}+\ldots+t_{ZKn}$).

The limit cycle number $n_G$ can be, for example, between one and thirty short-circuit cycles $Z_{Kn}$, preferably between five and twelve short-circuit cycles $Z_{Kn}$. In the event that the number n of short-circuit cycles $Z_{Kn}$ is greater than the defined limit cycle number $n_G$, the cold phase time $t_K$ is preferably determined by multiplying the set number n of short-circuit cycles $Z_{Kn}$ by an average short-circuit cycle time $t_{ZKD}$. The average short-circuit cycle time $t_{ZKD}$ can be specified, for example, based on empirical values or based on previously experimentally determined measured values. For example, the average short-circuit cycle time $t_{ZKD}$ can be between five and fifteen milliseconds, in particular ten milliseconds. The average short-circuit cycle time $t_{ZKD}$ can be considered known for the weld to be carried out and can, for example, be stored in the welding device or in the welding device control, for example also depending on other welding parameters. In general, the following applies to the cold phase duration $D_K$: $D_K=\Sigma t_{ZKn}$ for $n \leq n_G$ and $D_K=t_K=t_{ZKD}*n$ for $n>n_G$.

According to a further advantageous embodiment of the method, before the end of the cold phase time $t_K$ a tolerance point in time $t_T$ is determined from which the start of a new short-circuit cycle $Z_{Kn}$ is omitted, a short-circuit cycle ZKn carried out at the tolerance point in time $t_T$ being completed before the switch to the hot welding phase $P_W$. This is particularly advantageous if a new short-circuit cycle $Z_{Kn}$ were to be started shortly before the end of the cold phase time $t_K$. Since this would preferably be completed before the switch to the hot welding phase $P_W$, this could result in an excessive lengthening of the cold phase duration $D_K$, which can be in the range of a short-circuit cycle time $t_{ZKn}$ of a complete short-circuit cycle $Z_{Kn}$. The tolerance point in time $t_T$ can be selected, for example, in the range of a few milliseconds (for example 5 ms) before the end of the cold phase time $t_K$.

The advantages of the method should be clarified again using the following example. It is assumed, for example, that a CMT mix welding process with a number n=7 of short-circuit cycles $Z_{Kn}$ and a subsequent hot phase duration $D_W$ with a specific hot phase time $t_W$ is selected by a user via the user interface 17. This means that for the duration of the welding process, several total welding cycles $P_S$, each with a cold welding phase $P_K$ and a hot welding phase $P_W$, are carried out. The hot phase time $t_W$ of the hot phase duration $D_W$ is fixed in this example; the cold phase duration $D_K$ would, without setting a limit cycle number $n_G$ as in the conventional CMT mix method, correspond to the sum $\Sigma t_{ZKn}$ of the short-circuit cycle times $t_{ZKn}$ of the selected number n=7 of short-circuit cycles $Z_{Kn}$.

The aforementioned fluctuations in the individual short-circuit cycle times $t_{ZKn}$ can now have the result that a first cold phase duration $D_{K1}$ and consequently a first total welding cycle duration $D_{S1}$ (first total welding cycle duration $D_{S1}$=first cold phase duration $D_{K1}$+first hot phase duration $D_{W1}$) are longer, of the same length or shorter than a later second cold phase duration $D_{K2}$ and consequently a second total welding cycle duration $D_{S2}$ (second total welding cycle duration $D_{S2}$=second cold phase duration $D_{K2}$+second hot phase duration $D_{W2}$), the first hot phase duration $D_{W1}$ and the second hot phase duration $D_{W2}$ being substantially the same, for example each 100 ms (specified by the user). If the seven short-circuit cycles $Z_{Kn}$ of the first cold welding phase $P_{K1}$ each have a relatively short (average) short-circuit cycle time $t_{ZKn}$=8 ms due to fluctuations, for example, this would result in a first cold phase duration $D_{K1}$ of 56 ms and consequently a second total welding cycle duration $D_{S1}$ of 156 ms. If the seven short-circuit cycles $Z_{Kn}$ of the second cold welding phase $P_{K2}$ now each have a relatively long (average) short-circuit cycle time $t_{ZKn}$=12 ms due to fluctuations, for example, this would result in a second cold phase duration $D_{K2}$ of 84 ms and consequently a second total welding cycle duration $D_{S2}$ of 184 ms. This results in a difference of 28 ms between the two total welding cycle durations $D_{S1}$, $D_{S2}$ which, as described, would lead to uneven flaking of the weld seam.

In order to avoid this, according to the invention a limit cycle number $n_G$ of, for example, $n_G$=5 is now fixed and a cold phase time $t_K$=70 ms is fixed, which in turn is produced, for example, by multiplying the number n=7 of the selected short-circuit cycles $Z_{Kn}$ by an average short-circuit cycle time $t_{ZKD}$=10 ms. As a result of the specified or adjustable limit cycle number $n_G$=5, the cold phase duration $D_K$ for a presettable number n>$n_G$ of short-circuit cycles $Z_{Kn}$ is now determined by the specified cold phase time $t_K$=70 ms. For example, the cold phase time $t_K$ could be determined automatically by the control unit 14 from the number n of short-circuit cycles $Z_{Kn}$ and the average short-circuit cycle time $t_{ZKD}$, or it could be specified by the user. In the example mentioned, the first cold phase duration $D_{K1}$ and the second cold phase duration $D_{K2}$ would therefore each be 70 ms and the two total welding cycle durations $D_{S1}$, $D_{S2}$ would each be 170 ms. Of course, this is only an example and the individual short-circuit cycle times $t_{ZKn}$ do not have to be the same, but can also vary.

Since the short-circuit cycle $Z_{Kn}$ that is currently being carried out at the end of a cold phase time $t_K$ of a cold welding phase $P_K$ is preferably completed before the switch to the hot welding phase $P_W$, it can of course be the case that the total welding cycle duration $D_{S1}$, $D_{S2}$ of two total welding cycles $P_{S1}$, $P_{S2}$ do not exactly match, but the deviation is much smaller than in the conventional CMT mix process. If, for example, the last short-circuit cycle $Z_{Kn}$ of the first short-circuit welding phase $P_{K1}$ just about coincides with the end of the cold phase time $t_K$, the first cold phase duration $D_{K1}$ deviates only slightly from the cold phase time $t_K$, since no further short-circuit cycle $Z_{Kn}$ is carried out after the completion of the last short-circuit cycle $Z_{Kn}$ after exceeding the cold phase time $t_K$.

If, for example, the end of the cold phase time $t_K$ of the second cold welding phase $P_{K2}$ falls in the middle of the last currently executed short-circuit cycle $Z_{Kn}$, the second cold phase duration $D_{K2}$ would substantially correspond to the cold phase time $t_K$ plus the time that the currently executed short-circuit cycle $Z_{Kn}$ still requires until the end of the cycle. However, if the end of the cold phase time $t_K$ were to fall, for example, at the beginning of a short-circuit cycle $Z_{Kn}$ and the short-circuit cycle $Z_{Kn}$ were preferably to be completed before the switch to the hot welding phase $P_W$, it may be expedient, as described, to set a tolerance point in time $t_T$ from which no new short-circuit cycle $Z_{Kn}$ is started, as will be explained in more detail below with reference to FIG. 4a-c.

FIGS. 4a to 4c compare different sequences of the welding process, each having a cold welding phase $P_K$ (as a short-circuit welding phase) with a number n of short-circuit cycles $Z_{Kn}$ and a subsequent hot welding phase $P_W$ (as a pulse welding phase). A welding current I is plotted on the Y axis as an exemplary welding parameter and the time t is plotted on the X axis. Instead of the welding current I, however, the welding voltage U could also be applied, since the welding current I and welding voltage U behave substantially the same. Each short-circuit cycle $Z_{Kn}$ lasts a specific short-circuit cycle time $t_{ZKn}$, the individual short-circuit cycle times $t_{ZKn}$ of the short-circuit cycles ZKn being able to differ, as has already been described and is indicated in FIG. 4a-c. The change from the cold welding phase $P_K$ to the subsequent hot welding phase $P_W$ preferably takes place, as shown, at the end of the last short-circuit cycle $Z_{Kn}$ in each case, i.e. in the short-circuit phase KP of the short-circuit cycle $Z_{Kn}$.

A first cold welding phase $P_{KA}$ having a first cold phase duration $D_{KA}$ is shown in FIG. 4a. The limit cycle number $n_G$ is $n_G$=5 and the set number n of short-circuit cycles $Z_{Kn}$ is n=4. The set number n is therefore smaller than the limit cycle number $n_G$, so that the n=4 short-circuit cycles $Z_{Kn}$ are carried out and there is no switch to a time query (cold phase time $t_K$). The cold welding phase $P_{KA}$ is followed by the hot welding phase $P_{WA}$ for the hot phase duration $D_{WA}$. The first cold phase duration $D_{KA}$ thus corresponds to the sum $\Sigma t_{ZKn}$ of the short-circuit cycle times $t_{ZKn}$ of the number n=4 short-circuit cycles $Z_{Kn}$. The first total welding cycle duration $D_{SA}$ of the first total welding cycle $P_{SA}$ consequently results in $D_{SA}$=$D_{KA}$+$D_{WA}$. Due to the possible different short-circuit cycle times $t_{ZKn}$ of the short-circuit cycles $Z_{Kn}$, a subsequent overall welding cycle $P_{SA}$ can, for example have a longer or shorter welding cycle duration $D_{SA}$. A flake length $s_i$ of the welding flakes 20 (FIG. 3) that is as constant as possible therefore cannot be guaranteed, the deviation of the flake length $s_i$ of the welding flakes 20 being in an acceptable range due to the relatively small number n=4 of short-circuit cycles $Z_{Kn}$.

In the example according to FIG. 4b, a limit cycle number $n_G$=5 is specified and the number n of short-circuit cycles is set to n=7. The number n=7 of short-circuit cycles $Z_{Kn}$ is thus greater than the specified limit cycle number $n_G$=5. This means that the length of the cold phase duration $D_{KB}$ is consequently not determined by the sum $\Sigma t_{ZKn}$ of the number n=7 of short-circuit cycles $Z_{Kn}$, each having a short-circuit cycle time $t_{ZKn}$, but rather is determined by the cold phase time $t_K$. The cold phase time $t_K$ is preferably calculated from the number n of short-circuit cycles $Z_{Kn}$, in particular by multiplying the number n=7 of short-circuit cycles $Z_{Kn}$ by an average short-circuit cycle time $t_{ZKD}$. The average short-circuit cycle time $t_{ZKD}$ can originate, for example, from empirical values or, for example, can be averaged by the control unit 14 from previously performed welding processes, in particular from the short-circuit cycle times $t_{ZKn}$ of the short-circuit cycles $Z_{Kn}$. If, as shown in FIG. 4b, when the cold phase time $t_K$ has expired, the last short-circuit cycle $Z_{K7}$ has not yet been completed, this is preferably ended before the switch to the hot-welding phase $P_{WB}$. The cold phase duration $D_{KB}$ is then preferably calculated from the cold phase time $t_K$ plus the time $\Delta t$ that is necessary to complete the short-circuit cycle $Z_{K7}$ that has already started.

In the example according to FIG. 4c, a tolerance point in time $t_T$ is additionally specified before the end of the cold phase time $t_K$, which can take place via the control unit 14, for example. If a short-circuit cycle $Z_{Kn}$ that has just been carried out ends at a time between the tolerance point in time $t_T$ and the end of the cold phase time $t_K$, then after the end of this short-circuit cycle $Z_{Kn}$ (here the sixth short-circuit cycle $Z_{K6}$), there is preferably a direct switch to the hot welding phase $P_W$ without starting a new short-circuit cycle $Z_{Kn}$. The cold phase duration $D_{KC}$ of the cold welding phase $P_{KC}$ can therefore possibly also be shorter than the specified cold phase time $t_K$, which in turn preferably results from the number n of short-circuit cycles $Z_{Kn}$ and the average short-circuit cycle time $t_{ZKD}$.

The region between the tolerance point in time $t_T$ and the end of the cold phase time $t_K$ thus forms a tolerance window TF. If the short-circuit cycle $Z_{Kn}$ that has just been carried out ends within the tolerance window TF, preferably no new short-circuit cycle $Z_{Kn}$ is started. After each short-circuit cycle $Z_{Kn}$ it is therefore queried (for example by the control unit 14) whether or not the set cold phase time $t_K$ has already been reached and whether the end of the short-circuit cycle $Z_{Kn}$ is within the tolerance window TF. Since the short-circuit cycle $Z_{K6}$ in FIG. 4c ends before the end of the cold phase time $t_K$ and after the tolerance point in time $t_{TC}$ (i.e. in the tolerance window $TF_C$), no further short-circuit cycle $Z_{Kn}$ is carried out here, but instead there is a direct switch to the hot welding phase $P_{WC}$ (with a hot phase duration $D_{WC}$).

Of course, the examples mentioned are to be understood only as examples and are intended to illustrate the method. The specific design of the process, e.g. the selection of a specific protective gas SG, a specific electrode material, the selection of specific welding parameters such as wire feed, welding current I and welding voltage U, the selection of the number n of short-circuit cycles $Z_{Kn}$, and in particular the limit cycle number $n_G$ etc., is of course at the discretion of a person skilled in the art.

The invention claimed is:

1. A method for controlling a welding process with a consumable electrode, said method comprising:
   using at least two different sequential welding phases after ignition of an arc between the electrode and a base material, said phases comprising a cold welding phase used during a cold phase duration and a hot welding phase used during a subsequent hot phase duration;
   carrying out, in the cold welding phase, at least one short-circuit cycle with a short-circuit cycle time, and wherein a change is made to the hot welding phase after the cold welding phase;
   wherein a specific limit cycle number of short-circuit cycles is predetermined for the cold welding phase;
   wherein the cold phase duration of the cold welding phase is determined for a number of short-circuit cycles that exceeds the predetermined specific limit cycle number, depending on a determined cold phase time;
   wherein, to determine the cold phase duration, a short-circuit cycle, already started at the time of the end of the cold phase time, is completed, before changing to the hot welding phase.

2. The method according to claim 1, wherein:
   in order to determine the cold phase duration depending on the cold phase time before the end of the cold phase time, a tolerance point in time is specified from which the start of a new short-circuit cycle is not begun, a short-circuit cycle carried out at the tolerance point in time being ended before the change to the hot welding phase.

3. The method according to claim 1, wherein:
   the limit cycle number is selected to be between one and thirty.

4. The method according to claim 1, wherein:
   the limit cycle number is selected to be between five and twelve.

5. The method according to claim 1, wherein:
   the cold phase time is determined by multiplying the number of specified short-circuit cycles by an average short-circuit cycle time, the average short-circuit cycle time being set between five and fifteen milliseconds.

6. The method according to claim 1, wherein:
   the cold phase time is determined by multiplying the number of specified short-circuit cycles by an average short-circuit cycle time, the average short-circuit cycle time being ten milliseconds.

7. The method according to claim 1, wherein;
   the electrode is moved once per short-circuit cycle in a direction of the base material until it touches the base material and then, after a short circuit has formed, is moved away from the base material in an opposite direction.

8. The method according to claim 1, wherein:
   a pulsed welding current is used as the welding current in the hot welding phase.

9. The method according to claim 1, wherein:
   the cold phase duration of the cold welding phase is determined, for a number of short-circuit cycles that corresponds to the limit cycle number or is below the limit cycle number, by a sum of the short-circuit cycle times of the specified number of short-circuit cycles.

10. A welding device for carrying out a welding process comprising:
    at least one control for controlling the welding process;
    a welding torch and at least one feeder for feeding a consumable electrode to the welding torch;
    the control being configured at least to carry out a cold welding phase during a cold phase duration and to carry out a hot welding phase during a subsequent hot phase duration, at least one short-circuit cycle having a short-circuit cycle time being provided in the cold welding phase;
    wherein the control controls the cold phase duration of the cold welding phase;
    wherein a specific limit cycle number of short-circuit cycles is predetermined for the cold welding phase;
    wherein the cold phase duration of the cold welding phase is determined for a number to complete short-circuit cycles that exceeds a predetermined specific limit cycle number, depending on a determined cold phase time;
    wherein, after the cold welding phase, the control causes a change to the hot welding phase, the control being configured for completing a short-circuit cycle that has already started at the time of the end of the cold phase time before the change to the hot welding phase in order to determine the cold phase duration.

11. The welding device according to claim 10, wherein:
    in the control for determining the cold phase duration depending on the cold phase time, a tolerance point in time can be set before the end of the cold phase time, from which tolerance time a new short-circuit cycle is not begun, the control being provided for completing a short-circuit cycle carried out at the tolerance point in time before the change to the hot welding phase.

12. The welding device according to claim 10, wherein:
    the limit cycle number is between one and thirty.

13. The welding device according to claim 10, wherein:
    the limit cycle number is between five and ten.

14. The welding device according to claim 10, wherein:
    the control is configured for determining the cold phase time by multiplying the number of specified short-circuit cycles by an average short-circuit cycle time, the average short-circuit cycle time being between five and fifteen milliseconds.

15. The welding device according to claim 10, wherein:
    the control is provided for determining the cold phase time by multiplying the number of specified short-circuit cycles by an average short-circuit cycle time, the average short-circuit cycle time being ten milliseconds.

16. The welding device according to claim 10, wherein:
a user interface is configured for operating the welding device, the user interface being provided at least for specifying welding parameters, said welding parameters at least including specifying the limit cycle number.

17. The welding device according to claim 10, wherein:
the control is configured, in each short-circuit cycle, for moving the electrode in a direction of the base material until it touches the base material and then, after a short circuit has formed, for moving the electrode away from the base material in an opposite direction.

18. The welding device according to claim 10, wherein:
the control is configured for using a pulsed welding current in the hot welding phase.

19. The welding device according to claim 10, wherein:
the cold phase duration of the cold welding phase is determined, for a number of short-circuit cycles that corresponds to the specified limit cycle number or is below the specified limit cycle number, by a sum of the short-circuit cycle times of the number of short-circuit cycles.

\* \* \* \* \*